United States Patent
Hokeness et al.

(10) Patent No.: US 9,851,707 B2
(45) Date of Patent: Dec. 26, 2017

(54) BULK FIELD DEVICE OPERATIONS

(71) Applicant: Fisher-Rosemount Systems, Inc., Round Rock, TX (US)

(72) Inventors: Scott N. Hokeness, Lakeville, MN (US); Marcos A. Peluso, Chanhassen, MN (US); Charles H. Pille, Burnsville, MN (US); Paul J. Hurt, Lino Lakes, MN (US); Nghy A. Hong, Savage, MN (US); Qian (Jane) Xiao, Eden Prairie, MN (US)

(73) Assignee: Fisher-Rosemount Systems, Inc., Round Rock, TX (US)

( * ) Notice: Subject to any disclaimer, the term of this patent is extended or adjusted under 35 U.S.C. 154(b) by 604 days.

(21) Appl. No.: 14/477,266

(22) Filed: Sep. 4, 2014

(65) Prior Publication Data
US 2015/0066162 A1    Mar. 5, 2015

Related U.S. Application Data

(60) Provisional application No. 61/873,390, filed on Sep. 4, 2013.

(51) Int. Cl.
G05B 13/02    (2006.01)
G05B 19/042   (2006.01)

(52) U.S. Cl.
CPC ............ *G05B 19/0426* (2013.01); *G05B 2219/23192* (2013.01); *G05B 2219/25061* (2013.01); *G05B 2219/25428* (2013.01)

(58) Field of Classification Search
CPC ................................ G05B 19/0426
USPC ..................................... 700/28-55
See application file for complete search history.

(56) References Cited

U.S. PATENT DOCUMENTS

| | | | | |
|---|---|---|---|---|
| 5,796,602 A | * | 8/1998 | Wellan | G05B 19/0423 700/1 |
| 6,957,206 B2 | * | 10/2005 | Nolan | G06F 8/20 704/257 |
| 7,761,591 B2 | * | 7/2010 | Graham | G06Q 40/02 709/204 |
| 2005/0123884 A1 | * | 6/2005 | Walls | G05B 19/042 434/118 |
| 2006/0092039 A1 | * | 5/2006 | Saito | G05B 19/0423 340/6.1 |
| 2007/0078540 A1 | * | 4/2007 | Bump | G05B 19/41845 700/90 |
| 2008/0034015 A1 | * | 2/2008 | Behnen | G06F 17/30569 |

(Continued)

FOREIGN PATENT DOCUMENTS

| | | |
|---|---|---|
| JP | 2002-258936 A | 9/2002 |
| JP | 2003-186529 A | 7/2003 |

(Continued)

OTHER PUBLICATIONS

Fan, Jiyuan, and Stuart Borlase. "The evolution of distribution." IEEE Power and Energy magazine 7.2 (2009): pp. 63-68.*

(Continued)

*Primary Examiner* — Satish Rampuria
(74) *Attorney, Agent, or Firm* — Christopher R. Christenson; Kelly, Holt & Christenson, PLLC

(57) ABSTRACT

A computer-implemented method for configuring a plurality of field devices is provided. The method includes defining a configuration template and mapping the configuration template to a plurality of field devices. The defined configuration template is automatically applied to the plurality of field devices. A method of verifying field device configuration information is also provided.

16 Claims, 10 Drawing Sheets

(56) References Cited

U.S. PATENT DOCUMENTS

2011/0191500 A1* 8/2011 Odayappan ........ G05B 19/0426
710/8
2013/0211547 A1 8/2013 Buchdunger et al.
2014/0212978 A1 7/2014 Sharpe, Jr. et al.

FOREIGN PATENT DOCUMENTS

| JP | 2005-531826 A | 10/2005 |
|---|---|---|
| JP | 2006-302229 A | 11/2006 |
| JP | 2008-192152 A | 8/2008 |
| JP | 2009-505232 A | 2/2009 |
| JP | 2009-518749 A | 5/2009 |
| JP | 2011-059873 A | 3/2011 |
| JP | 2011-203954 A | 10/2011 |
| JP | 2012032899 A | 2/2012 |

OTHER PUBLICATIONS

Chen, Deji, Mark Nixon, and Aloysius Mok. "Why WirelessHART." WirelessHART™. Springer US, 2010. pp. 195-199.*

Wollschlaeger, Martin, et al. "Integration of fieldbus systems into on-line asset management solutions based on fieldbus profile descriptions." Factory Communication Systems, 2002. 4th IEEE International Workshop on. IEEE, 2002. pp. 89-96.*

"475 Field Communicator" Product Data Sheet, Emerson Process Management, May 2013, available at: <www.fieldcommunicator.com>, 8 pages.

"AMS Suite—Improve Reliability and Performance", Emerson Process Management, 2013, available at: <www.assetweb.com>, 16 pages.

First Office Action for Chinese Patent Application No. 201480003931.5 dated Nov. 9, 2016, 27 pages.

International Search Report and Written Opinion for International Application No. PCT/US2014/054055, dated Dec. 17, 2014, Date of Filing: Sep. 4, 2014, 15 pages.

EPO Communication for European Patent Application No. 14841731.4, dated Mar. 16, 2017, 12 pages.

Office Action for Japanese Patent Application No. 2016-540377, dated Mar. 7, 2017, 7 pages with English translation.

Second Office Action for Chinese Patent Application No. 201480003931.5. dated Jul. 6, 2017, 27 pages including English translation.

Decision on Rejection for Japanese Patent Application No. 2016-540377, dated Oct. 31, 2017, 9 pages including Engiish translation.

* cited by examiner

| Tag | High Alarm | | High Sat. | | Analog Output Low Alarm | | Low Sat. | | PV is | |
|---|---|---|---|---|---|---|---|---|---|---|
| | Value | Unit | Value | Unit | Value | Unit | Value | Unit | Value | |
| UC2-FF | 21.75 | mA | 20.50 | mA | 3.75 | mA | 3.90 | mA | Not used | |
| V11RZ2CO2CH01 | 21.50 | mA | 20.00 | mA | 3.75 | mA | 3.80 | mA | Snsr 1 | |
| V11RZ2CO2CH01 | 21.50 | mA | 20.50 | mA | 3.60 | mA | 3.80 | mA | Snsr 1 | |

BULK FIELD DEVICE OPERATIONS

CROSS-REFERENCE TO RELATED APPLICATIONS

The present application is based on and claims the benefit of U.S. Provisional Patent Application Ser. No. 61/873,390, filed Sep. 4, 2013, the content of which application is hereby incorporated by reference in its entirety.

BACKGROUND

Field devices, such as process variable transmitters, are used in the process control industry to remotely sense a process variable. Field devices, such as process actuators, are used by the process control industry to remotely control physical parameters of a process, such as flow rate, temperature, et cetera. The process variable may be transmitted to a control room from a field device to provide information about the process to a controller. The controller may then transmit control information to another field device, such as an actuator, to modify a parameter of the process. For example, information related to a pressure of a process fluid may be transmitted to a control room and used to control a process such as oil refining.

Intelligent field devices are field devices that include processing circuitry and communicate digitally on a process communication loop or segment. Examples of such digital process communication include process communication protocols such as the Highway Addressable Remote Transducer (HART®) protocol, the FOUNDATION™ Fieldbus protocol, Profibus, WirelessHART (such as that in accordance with IEC62591) et cetera. Additional examples of digital communication include communication on a MUX network, a Wireless Gateway network, a modem network, or any other suitable digital communication network. These intelligent field devices are more complex than the analog field devices which they often replace. However, intelligent field devices are able to provide additional information and control functions in comparison to analog, 4-20 mA, field devices.

Before intelligent field devices can be used on a process communication loop or segment, they must be configured properly in order to effectively communicate valid process data to control systems, programmable logic controllers, and/or remote terminal units. Field devices can also provide valuable diagnostic information about their own health as well as the process health. To take advantage of this functionality and to avoid false alarms, it is important to configure the diagnostic functions and alert levels properly. However, configuring intelligent field devices can be a time-consuming and error-prone process. Considering that in some large processing plants, hundreds if not thousands of intelligent field devices may be used to control, monitor, and maintain production processes within safe limits, the efforts required for such configuration are not trivial.

Historically, intelligent field devices have been configured individually using handheld communicators, such as that sold under the trade designation Model 475 Field Communicator available from Emerson Process Management of Austin, Tex. Alternatively, intelligent field devices have also been configured individually using configuration software such as that sold under the trade designation AMS Device Manager available from Emerson Process Management.

SUMMARY

A computer-implemented method for configuring a plurality of field devices is provided. The method includes defining a configuration template and mapping the configuration template to a plurality of field devices. The defined configuration template is automatically applied to the plurality of field devices. A method of verifying field device configuration information is also provided.

BRIEF DESCRIPTION OF THE DRAWINGS

FIG. 5 is a screenshot of a user interface allowing a user to generate a mapping between a user configuration and one or more individual field devices in accordance with an embodiment of the present invention.

FIG. 8 is a screenshot of a user interface a user to select configuration for which to create reports in accordance with an embodiment of the present invention.

FIG. 9 is a screenshot of a user interface providing a device parameter search result for a bulk search operation applied to a plurality of field devices in accordance with an embodiment of the present invention.

DETAILED DESCRIPTION OF ILLUSTRATIVE EMBODIMENTS

Embodiments of the present invention generally provide a template or generic configuration that defines configuration information for a plurality of intelligent field devices of the same type and provides a method to apply the template to one or more connected and commissioned intelligent field devices or to a virtual device (i.e., a place holder established during a process plant project). In such a project, a number of such virtual field devices can be identified with similar device configurations. Embodiments provided herein accordingly provide a way for a user employing an asset management system to configure multiple intelligent field devices at substantially the same time. By employing such a template, user corporate standards can be easily defined and implemented across a process plant unit, across an entire plant, or across an entire enterprise.

Two distinct bulk operations will be described below. A first bulk operation is provided to configure a plurality of intelligent field devices based upon a user configuration template. A second bulk operation is provided to allow a user to perform field device verification and validation based upon a user configuration template. However, those skilled in the art will recognize that additional bulk field device operations can be practiced in accordance with various embodiments described herein.

Figure 1:
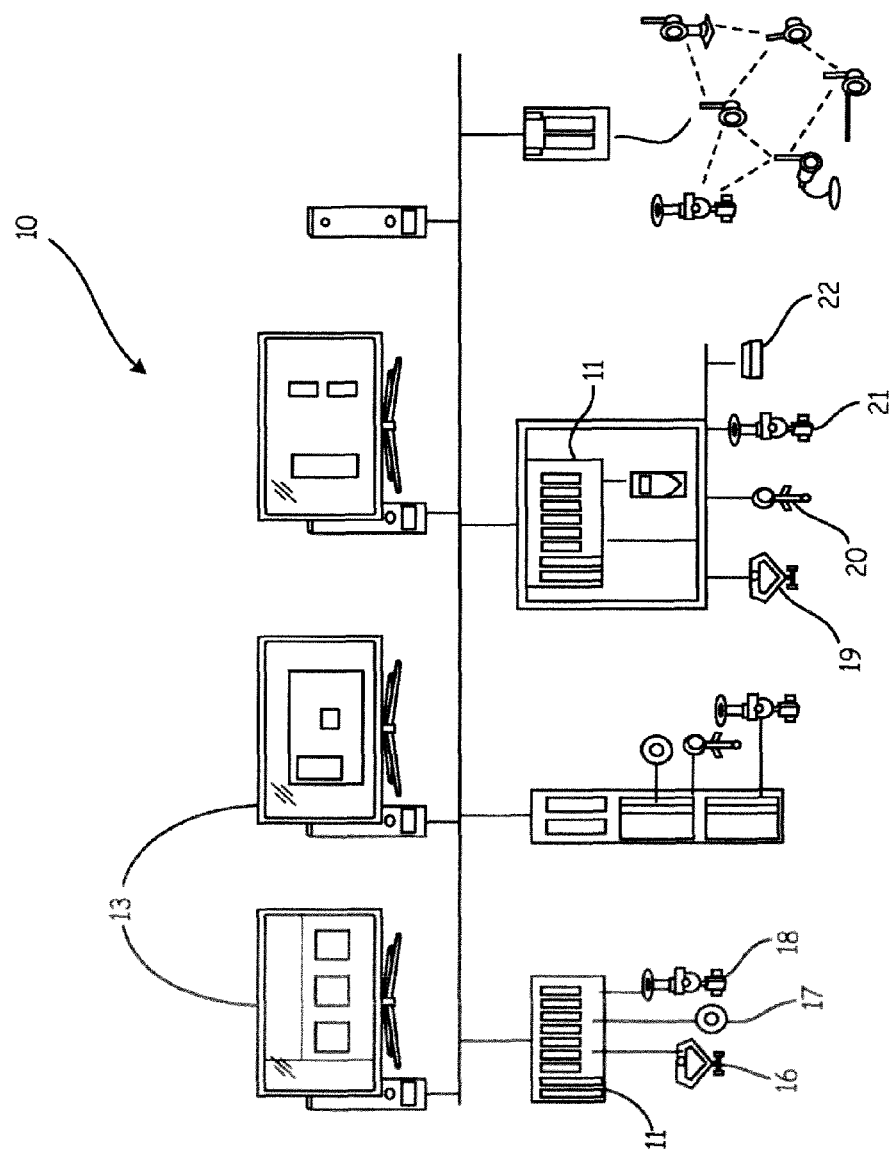
FIG. 1 is a diagrammatic view of a process control and monitoring system employing a number of intelligent field devices with which embodiments of the present invention are particularly useful.

FIG. 1 is a diagrammatic view of a process control and monitoring system with which embodiments of the present invention are particularly useful. Process control and monitoring system 10 includes one or more process controllers 11 coupled to one or more host workstations or computers 13 (which may include any suitable computing devices) each having a user interface that includes a screen and a user input device. Process controllers 11 are coupled to intelligent field devices 16-22 through suitable input/output cards or modules. Process controllers 11 may be any suitable process controller. Process controllers 11 as well as the other communication interface devices shown in FIG. 1 are communicatively coupled to host workstations 13 via an Ethernet connection or any suitable data communication protocol. Process controllers 11 are also communicatively coupled to intelligent field devices 16-22 using a suitable smart communication protocol, such as FOUNDATION™ Fieldbus protocol, the HART® protocol, et cetera. Additional examples of digital communication include communication on a MUX network, a Wireless Gateway network, a modem network, or any other suitable digital communication network.

Intelligent field devices 16-22 may be any suitable intelligent field devices, such as process variable transmitters, valves, positioners, et cetera. Input/output cards or modules may be any suitable type of devices that conform to a standard process communication protocol. For example, one I/O card may be a HART® I/O card that communicates in accordance with the HART® protocol with intelligent field devices 16, 17, and 18. Additionally, another I/O card or module may be a FOUNDATION™ Fieldbus card allowing a process controller 11 to communicate in accordance with the FOUNDATION™ Fieldbus protocol to intelligent field devices 19, 20, 21, and 22.

Process controller 11 includes a processor that implements or oversees one or more process control routines (stored in memory) and communicates with intelligent field devices 16-22 and the host computers 13 to control a process in any desired manner. Thus, process controllers 11 or other suitable communication interfaces allow workstations 13 to interact with the process via intelligent field devices 16-22. A process controller 11 and any I/O modules employed therein are shown as one exemplary environment where communication with a plurality of field devices is performed. However, embodiments of the present invention can be practiced in any environment where digital communication with a plurality of intelligent field devices is possible through any suitable interface.

Figure 2:
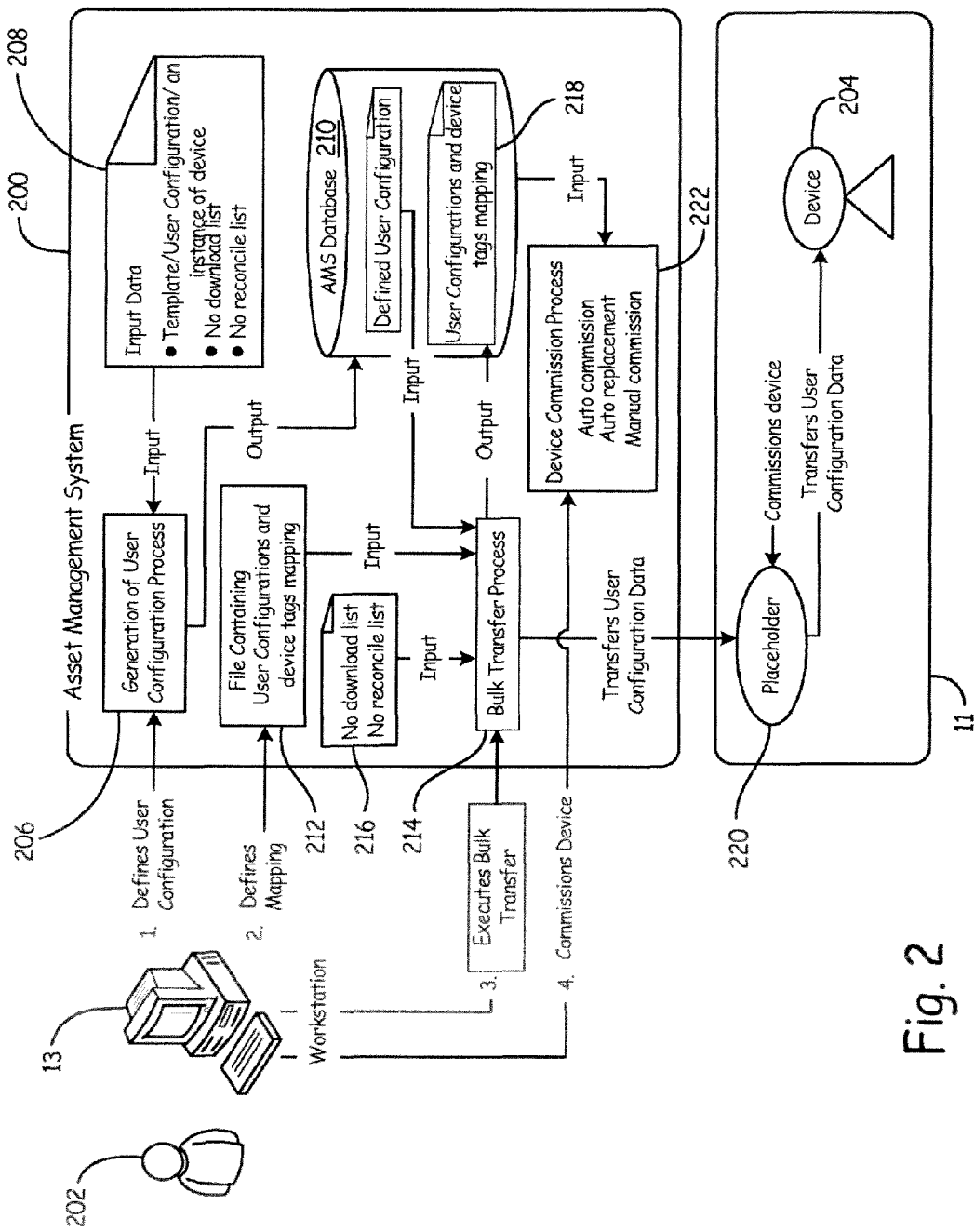
FIG. 2 is a diagrammatic view of an operator interacting with an asset management system in order to perform a bulk operation on a plurality of field devices in accordance with an embodiment of the present invention.

FIG. 2 is a diagrammatic view of a user interacting with an asset management system 200 to perform bulk field device operations in accordance with an embodiment of the present invention. Asset management system 200 generally includes one or more software applications executing on one or more workstations 13 to provide high-level interaction between a user and the individual intelligent field devices of the process control and monitoring system. Such high-level interaction includes diagnostics, maintenance, configuration, et cetera. While workstation 13 may have one or more asset management system applications running locally, embodiments of the present invention include a user interacting with asset management system 200 remotely via a data communication network. Thus, user 202 seated at workstation 13 can interact with asset management system 200 in order to perform a variety of high level functions relative to intelligent field devices 204 regardless of the physical location of user 202.

In accordance with an embodiment of the present invention, user 202 is able to generate a user configuration process 206 where the user provides a template/user configuration as well as an instance of an intelligent field device, as illustrated diagrammatically at reference numeral 208. A user configuration is a set of device parameters customized by a user to be used as a model for other device configurations. Additionally, user 202 can provide additional input, such as a "no download" list and a "no reconcile" list. These are lists of intelligent device parameters that may be exempted from application of the bulk operation. Once user 202 has provided the requisite information, the user configuration is stored in a database in any suitable format. In the embodiment shown in FIG. 2, the user configuration is stored in asset management system database 210. Next, user 202 defines a mapping relative to the defined user configuration. This is a file or other suitable data structure that links the user configuration to individual device tags or identifiers of intelligent field devices. This is illustrated at reference numeral 212 in FIG. 2. Next, user 202 executes a bulk operation as illustrated at block 214.

In the embodiment illustrated in FIG. 2, the bulk operation is a bulk transfer of user configuration information to a plurality of field devices. The bulk operation takes as input a no download/no reconcile list 216, the mapping file created at block 212, and the defined user configuration stored in asset management database 210. However, embodiments of the present invention can be practiced where the database is a database of a suitable control system. Bulk transfer process 214 then provides as an output a number of user configurations and device tags mapping 218 which is also preferably stored in asset management database 210. Additionally, the bulk transfer utility may transfer user configuration data to one or more placeholders 220 within the process controller 11. Finally, as illustrated at block 222, user 202 engages the device commissioning process. When this occurs, asset management system 200 receives the stored user configurations and device tags mapping from asset management database 210 and automatically applies the user configuration information to the intelligent field devices having device tags that match the device tags set forth in mapping 218. In this way, the user can engage a process that configures a significant number of field devices automatically without having to address each intelligent field device individually.

Figure 3:
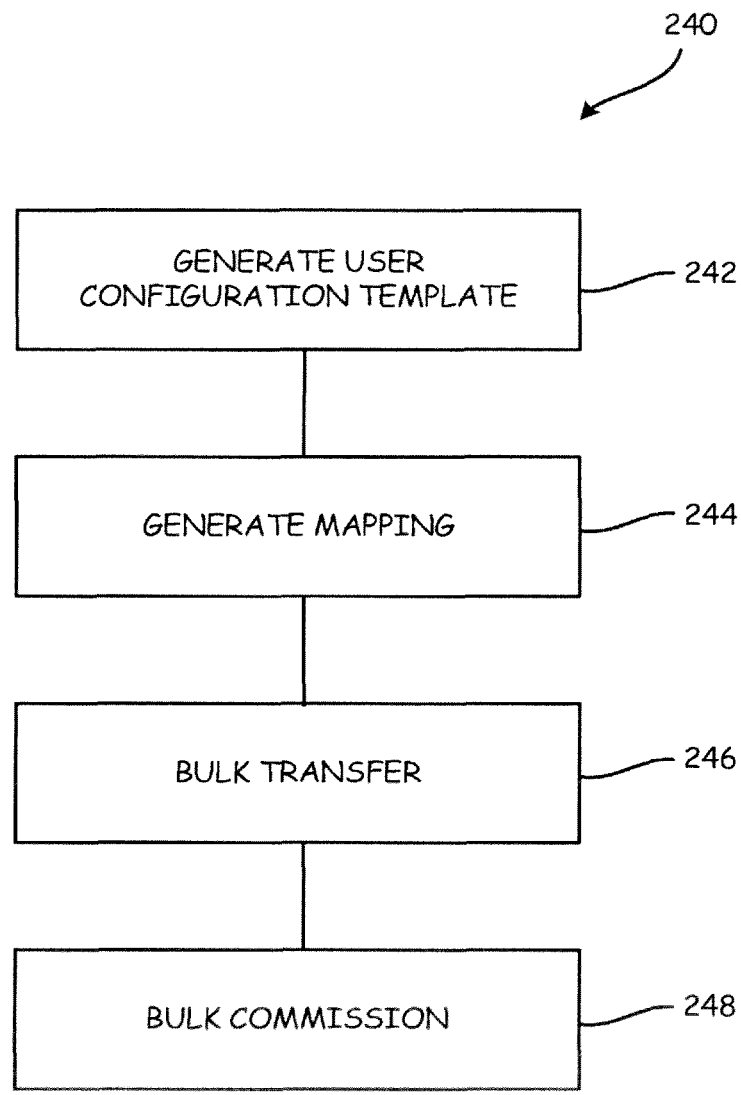
FIG. 3 is a flow diagram of a method of bulk configuration of intelligent field devices in accordance with an embodiment of the present invention.

FIG. 3 is a flow diagram of a method of bulk configuration of intelligent field devices in accordance with an embodiment of the present invention. Method 240 begins at block 242 where a user (such as user 202) generates a user configuration template. In creating the template, the user can easily define and implement suitable corporate standards across an individual processing plant unit, an entire processing plant, or an entire enterprise. At block 244, the user generates a mapping table of the template or templates defined at block 242 to one or more intelligent field devices. The intelligent field devices can be specified by any suitable identifier, such as device tags or some other suitable identifier. Additionally, the mapping can be stored in any suitable format, such as a Microsoft Excel spreadsheet, or any suitable data structure. Next, at block 246, a bulk transfer of the configuration information is initiated in the asset management system. At block 248, a bulk commissioning of the field devices is performed wherein each individual field device is provided with the configuration information stored in the user template that is mapped to that respective intelligent field device. While the bulk commissioning of the field devices may occur simultaneously, it may also occur sequentially, as long as no further user interaction is required as the bulk operation steps through each intelligent field device. Thus, from the user's perspective, a single command to execute the bulk commissioning or configuration of the intelligent field devices will result in the operation being automatically performed, either in parallel or sequence on the specified intelligent field devices.

Figure 4:
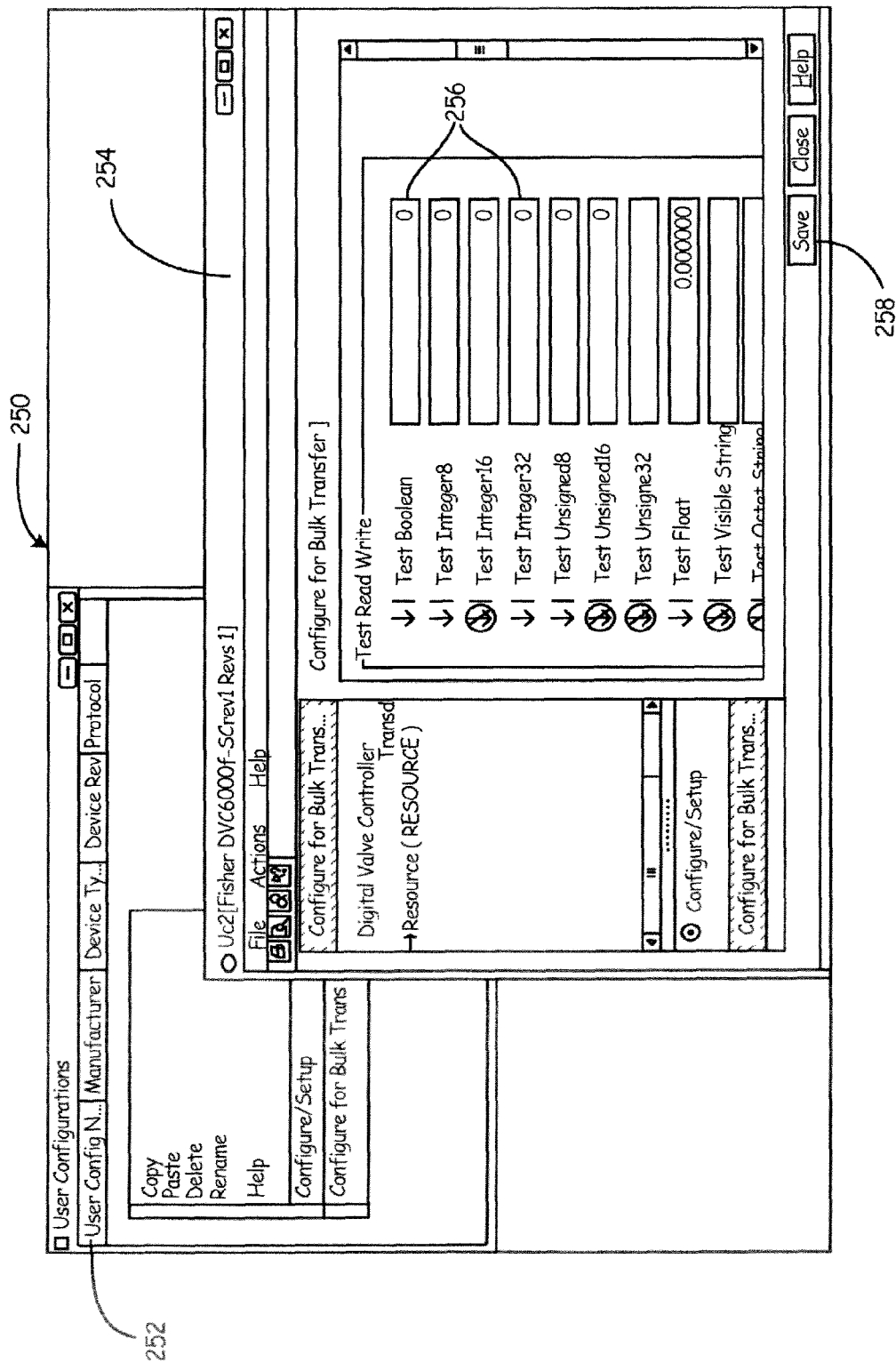
FIG. 4 is a screenshot of a user interface allowing a user to define a configuration template that can be applied to a plurality of field devices in accordance with an embodiment of the present invention.

FIG. 4 is a screenshot of a user interface allowing a user to generate one or more user configurations in accordance with an embodiment of the present invention. User interface 250 has a user configuration name column 252 under which two distinct user configurations are listed. Specifically, uc1 and uc2 are shown. Additionally, a dialog 254 is illustrated allowing a user to configure block transfer for a selected user configuration (in this case uc2). A number of parameters are illustrated as well as windows 256 that receive values for such parameters. Once the user has entered or otherwise configured the user configuration for bulk transfer, the user configuration may be saved via button 258.

Figure 5:
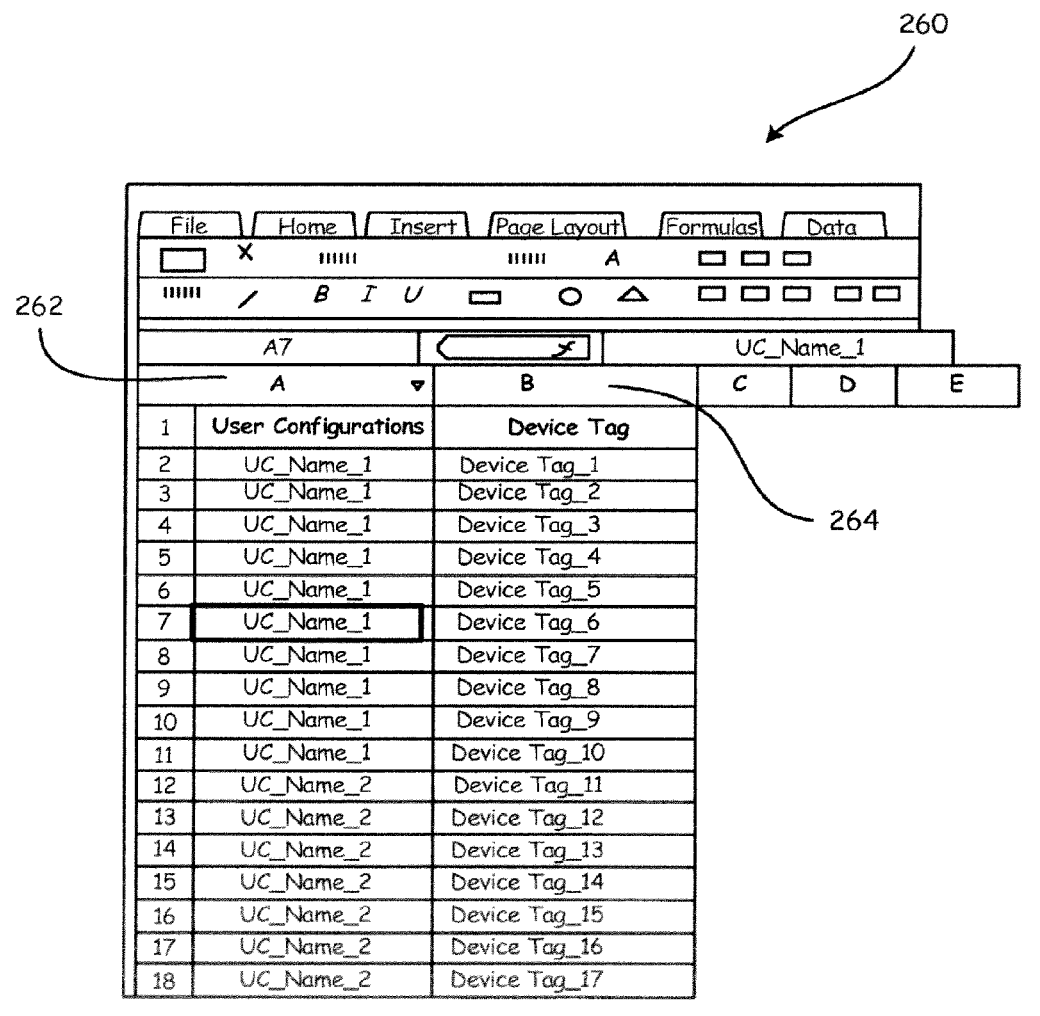

FIG. 5 is a screenshot of a mapping of user configurations to device tags in accordance with an embodiment of the present invention. In screenshot 260, a number of user configurations are set forth in column 262 while a number of device tags are set forth in column 264. In the mapping shown in FIG. 5, each row (such as row number 2) is an association between the specified user configuration and the listed device tag. For example, in the highlighted row 7, user configuration "UC_Name_1" is associated with "Device_Tag_6." However, as set forth above, the mapping between one or more intelligent field devices and a given user configuration can be provided in any suitable format. In the embodiment shown in FIG. 5, the mapping is provided in document such as a spreadsheet, such as that sold under the trade designation Excel available from Microsoft Corporation of Redmond, Wash.

Figure 6:
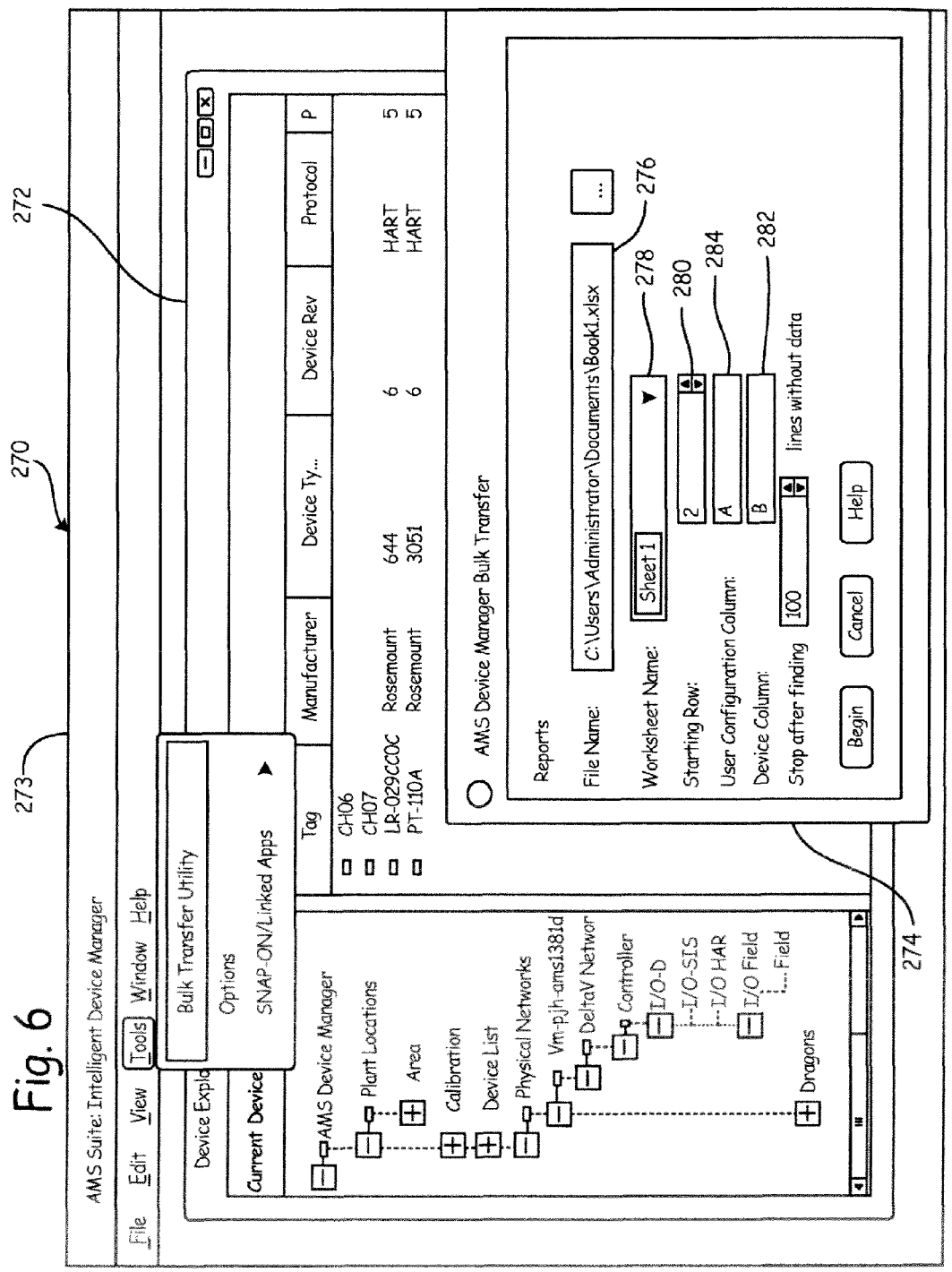
FIG. 6 is a screenshot of a user interface allowing a user to execute a bulk operation on a plurality of field devices in accordance with an embodiment of the present invention.

FIG. 6 is a diagrammatic screenshot of a user interface allowing a user to begin a bulk operation on a plurality of field devices in accordance with an embodiment of the present invention. Screenshot 270 includes a "device explorer" window 272 that lists or otherwise enumerates the various intelligent field devices supported by the AMS Suite: Intelligent Device Manager 273. As shown, these intelligent field devices can be enumerated hierarchically based upon plant locations, individual plants, and individual equipment. Screenshot 270 also shows dialog window 274 provided to initiate bulk commissioning of a plurality of intelligent field devices of the same type. Dialog 274 includes a file name field 276 that specifies a file containing the mapping of the various field devices to one or more defined user configuration templates. Additionally, dialog 274 may include a worksheet name field 278 that defines the worksheet within the file that has the mapping information. However, as set forth above, any suitable data structure or file format can be used for the mapping function. Next, a field 280 is provided to allow the user to define a portion of the mapping to be excluded. For example, row 1 may contain a header, and thus will not contain a user configuration and field device mapping. Accordingly, exempting row 1 from the bulk operation ensures robust execution of the operation, by defining the starting row as row 2. Dialog 274 also includes a Device Column field 282. This field 282 allows the user to indicate the specific column in the worksheet specified in field 278 of file 276 that contains the specific intelligent field device identifiers, such as device tags. Similarly, field 284 allows the user to specify the user configuration column. In the example shown in FIG. 6, the user configuration column is selected as column A, while the device column is selected as column B. Referring back to the screenshot with respect to FIG. 5, user configuration information is set forth in column A, while device tag information is set forth in column B. Additionally, row 1 of the worksheet illustrated in screenshot 260 does include header information, and thus should not be executed during the operation. Accordingly, the bulk transfer information entered into dialog 274 is appropriate for the mapping file illustrated with respect to FIG. 5.

Figure 7:
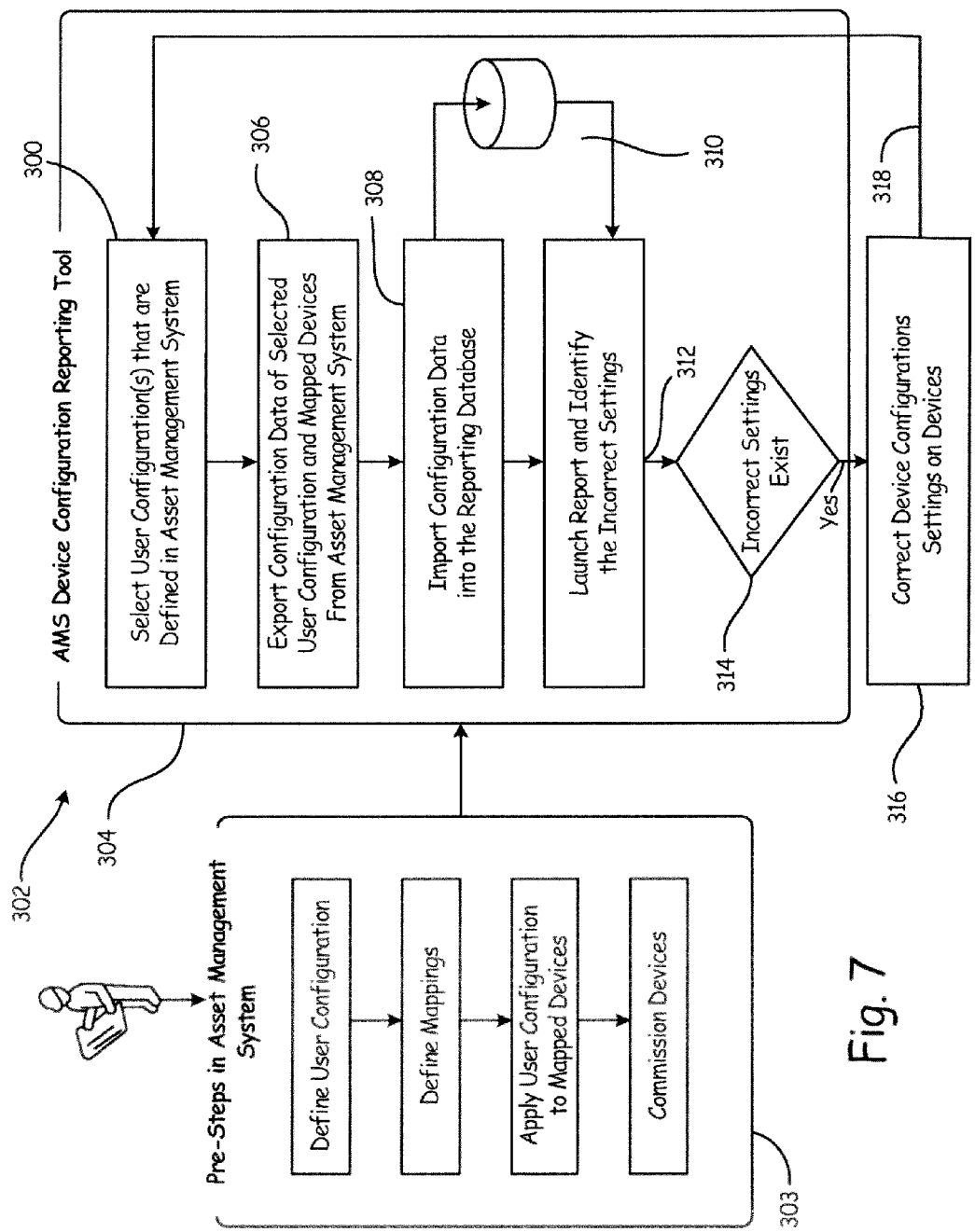
FIG. 7 is a diagrammatic view of a method of verifying and/or validating intelligent field device configuration information in accordance with an embodiment of the present invention.

FIG. 7 is a diagrammatic view of a method of executing a bulk verification and/or validation operation on a plurality of intelligent field devices in accordance with an embodiment of the present invention. Before method 300 begins execution by reporting tool 302, a number of preliminary steps are required, as set forth at block 303. Specifically, one or more user configurations must be defined with respect to one or more respective individual intelligent field devices. Furthermore, each intelligent field device must be mapped to a user configuration. Further, the user configuration should be applied to the mapped intelligent field devices, and the intelligent field devices should be commissioned in accordance with the user configuration. Accordingly, the preliminary steps illustrated in block 304 are essentially illustrated above with the embodiment described with respect to FIGS. 2-6.

Reporting tool 302 provides an efficient way for a user to verify if intelligent field devices are configured in accordance with the user configuration specified for each respective intelligent field device. Thus, the user need not interact with each intelligent field device individually in order to provide such verification. As can be appreciated, verifying the device configuration settings for hundreds or even thousands of intelligent field devices using traditional methods is very time consuming. Accordingly, employing method 300 significantly reduces the time required to provide such verification.

Method 300 begins at block 304 where a user selects one or more user configurations that are defined in the asset management system. As set forth above, these user configurations are defined by the user and typically stored in asset management database 210. At block 306, reporting tool 302 exports configuration data of one or more selected user configurations as well as mapped devices from the asset management system. At block 308, the configuration data is imported into a reporting database 310, or other suitable storage facility. Alternatively, the configuration data could be retrieved from live field devices and imported into a standardized format, such as XML. At block 312, the configuration data of each individual intelligent field device is compared with that specified in the applicable user configuration template, and a report identifying discrepancies and/or incorrect settings is generated. If any incorrect settings exist, as determined at block 314, the user is prompted, at block 316 to correct device configuration settings on the specified intelligent field devices. Once such correction has been performed, reporting tool 312 repeat the method by returning to block 304, as illustrated at line 318.

Figure 8:
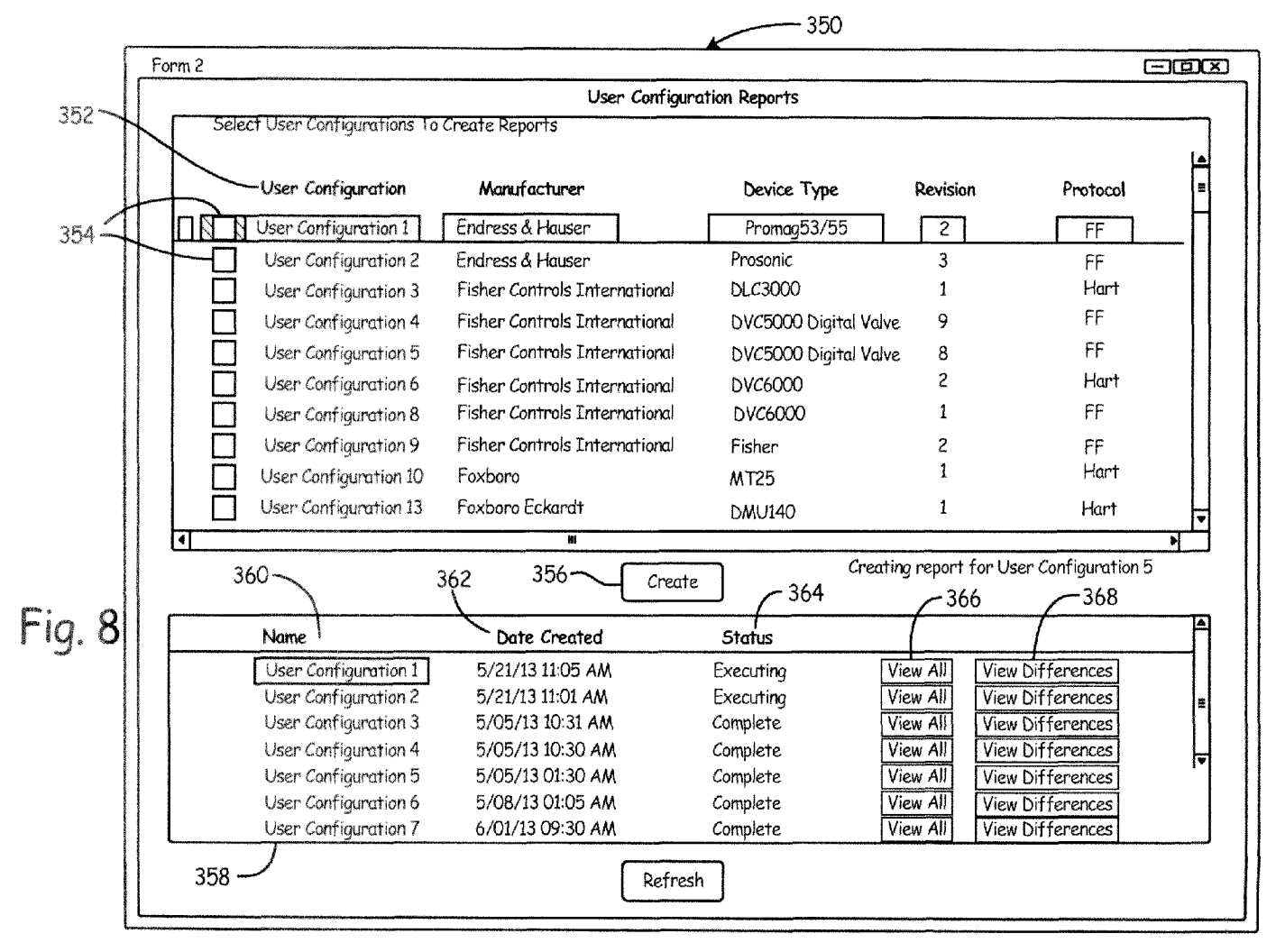

FIG. 8 is a screenshot of a user interface allowing a user to select one or more user configurations to create reports. Screenshot 350 includes a column 352 listing a number of defined user configurations adjacent respective check boxes 354. The user selects one or more of the listed user configurations by entering a check or x in the box 354 adjacent the desired user configuration. Once one or more user configurations have been selected, the user may initiate the report generation process by engaging create button 356. Screenshot 350 also indicates that the user interface includes a "Reports" window 358 listing reports that have been generated for different user configurations in column 360 as well as the date and time at which each respective report was created, in column 362. Further, the status of the individual report is provided at column 364. As shown in FIG. 8, the reports for user configuration 1 and user configuration 2 are executing, while the reports for user configurations 3-7 are complete. For each report that generates, all of the results of the report can be viewed by pressing the "View All" button 366. For convenience, the user may simply wish the view the differences between the configuration information set forth in each individual intelligent field device and that specified in the applicable user configuration by clicking the "View Differences" button 368. When the reports are generated, the device configuration data of the user configuration and mapped intelligent field devices will be displayed in a single table, in one embodiment. The report can provide the ability to view, compare and search device configuration data and quickly identify the devices with "incorrect" device configuration settings. Accordingly, embodiments provided herein allow a user to compare hundreds of intelligent field devices at once efficiently ensuring compliance with plant and corporate engineering standards.

FIG. 9 is a screenshot of a device parameter search result in accordance with an embodiment of the present invention. Screenshot 380 illustrates two devices (V11RZ2C02CH01; and V11RZ2C0ZCH02) compared to user configuration (template) UC2-FF. Additionally, the device parameters which satisfy one or more search criteria defined with respect to the report are illustrated in the various columns set forth in screenshot 380. This allows a user to quickly identify intelligent field devices that may have incorrect device configuration settings, as set forth above.

Figure 10:
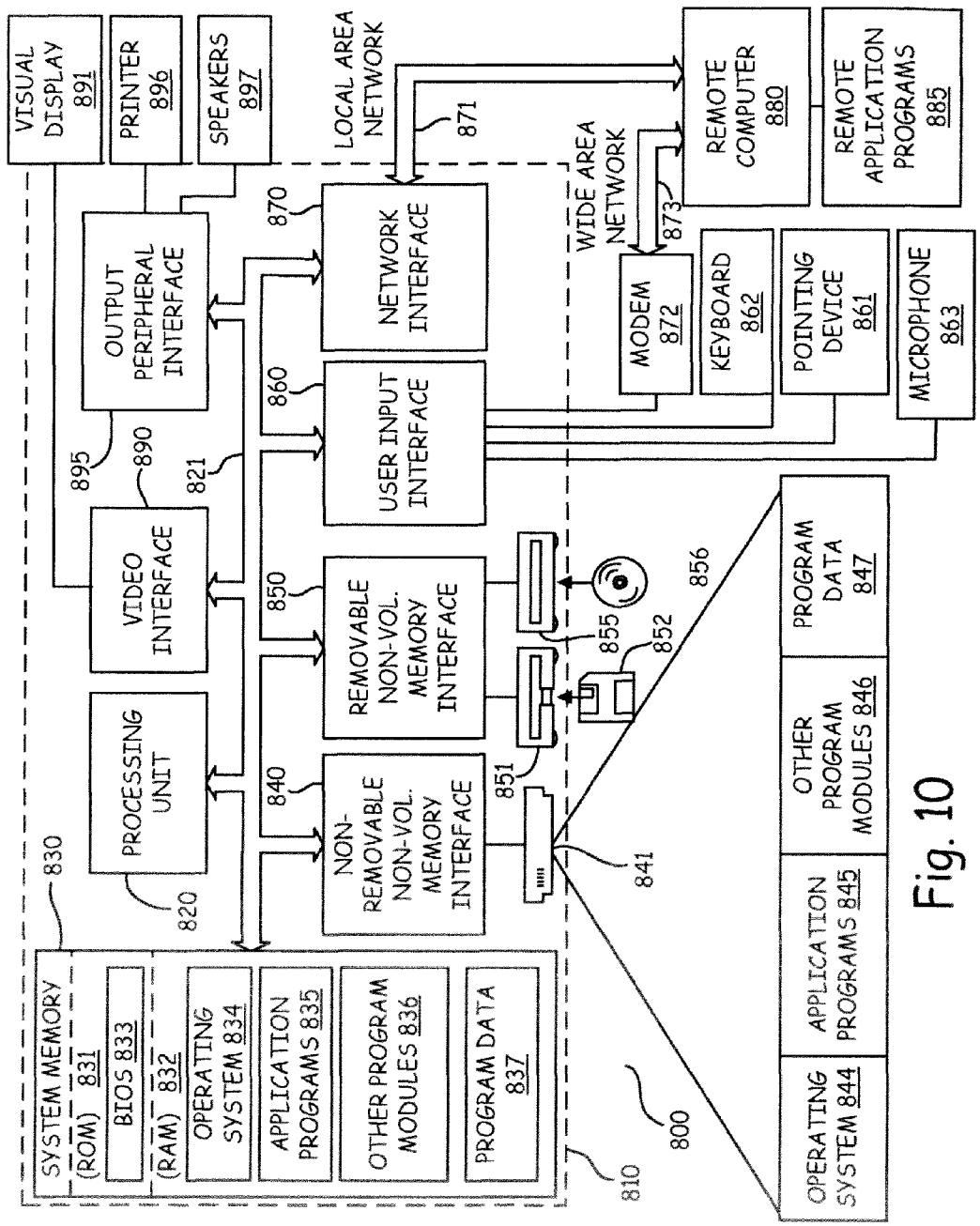
FIG. 10 is a diagrammatic view of one exemplary computing environment upon which the asset management system illustrated with respect to FIG. 2 may be embodied.

FIG. 10 is a diagrammatic view of a computing environment on which one or more applications of the asset management system may execute. Additionally, it is expressly contemplated that the asset management system may comprise multiple computing devices working cooperatively or individually to execute one or more individual software applications in an asset management suite. With reference to FIG. 10, an exemplary system for implementing some embodiments includes a general-purpose computing device in the form of a computer 810. Components of computer 810 may include, but are not limited to, a processing unit 820 (which can comprise processor 114), a system memory 830, and a system bus 830 that couples various system components including the system memory to the processing unit 820. The system bus 821 may be any of several types of bus structures including a memory bus or memory controller, a peripheral bus, and a local bus using a variety of but architectures. Memory and programs described with respect to FIG. 2 can be employed in corresponding portions of FIG. 10.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in a manner so as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 10 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (PSSPs), System-on-a-chip systems (SOCs), Complex Programmable Logic Devices (CPLDs), etc.

The drives and their associated computer storage media discussed above and illustrated in FIG. 10, provide storage of computer readable instructions, data structures, program modules and other data for the computer 810. In FIG. 10, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or a wide area network—WAN) to one or more remote computers, such as a remote computer 880. When used in a LAN networking environment, computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in the remote memory storage device. FIG. 10 illustrates, for example, that remote application programs 885 can reside on remote computer 880.

Although the present invention has been described with reference to preferred embodiments, workers skilled in the art will recognize that changes may be made in form and detail without departing from the spirit and scope of the invention. For example, while the embodiments described above generally employ an online connection with an intelligent field device, embodiments can be practiced where the configuration(s) is loaded into a handheld configurator that would update an individual intelligent field device if the device identifier matches a device tag associated with a configuration stored in the handheld device.

What is claimed is:

1. A computer-implemented method for configuring a set of field devices, the method comprising:
   receiving user selection of device parameters to define a configuration template, which is stored in an asset management database;
   identifying the set of field devices for application of the defined configuration template, by identifying a field device identifier corresponding to each of the set of field devices;
   mapping the configuration template to the set of field devices by generating an association between a name of the configuration template and the field device identifier;
   automatically applying the configuration template to the set of field devices, the automatic application including initiating a bulk transfer of the configuration template, using an asset management system, and commissioning the set of field devices in a bulk commissioning process; and
   wherein the automatic application of the configuration template is accomplished with a single command from the user.

2. The computer-implemented method of claim 1, wherein defining a configuration template includes receiving, through a user interface, a set of device configurations to be used as a model for a plurality device configurations.

3. The computer-implemented method of claim 1, wherein at least one of the set of field devices is a virtual field device.

4. The computer-implemented method of claim 1, wherein the field device identifier is a device tag.

5. The computer-implemented method of claim 1, wherein the association between the set of field devices and the configuration is individually listed in a document.

6. The computer-implemented method of claim 5, wherein the document is a spreadsheet.

7. A computer-implemented method for verifying configuration information of a plurality of field devices, the method comprising:
   accessing a configuration template from an asset management system storage component storing a plurality of configuration templates;
   retrieving field device configuration information for the plurality of field devices from the asset management system storage component;
   generating a map associating a name of the configuration template with a field device identifier for each field device of the plurality of field devices;
   accessing the map relating the configuration template to the plurality of field devices; and
   automatically comparing information stored in the configuration template with field device configuration information for each field device mapped to the configuration, wherein automatically comparing information comprises identifying incorrect field device settings for the plurality of field devices, and
   wherein the automatic comparison is initiated for the plurality of field devices with a single action.

8. The computer-implemented method of claim 7, wherein the configuration template includes a set of device configurations that serves as a model for a plurality field device configurations.

9. The computer-implemented method of claim 7, wherein the method is executed by a report tool.

10. The computer-implemented method of claim 7, and further comprising generating a report indicating configuration information for each field device.

11. The computer-implemented method of claim 10, and further comprising receiving search criteria relative to the report and responsively providing a search result based on the search criteria.

12. The computer-implemented method of claim 10, and further comprising providing a status identifier for the report.

13. The computer-implemented method of claim 7, and further comprising generating a report indicating incorrect configuration information for each field device.

14. A system comprising:
   a processor;
   a storage device coupled to the processor stores a user configuration template and a map associating the user configuration template to a plurality of intelligent field devices where each field device has a field device identifier;
   a user interface component generates a user interface that receives a newly defined user configuration template from a user, and also configured to receive a map relating the newly defined user configuration template to a plurality of intelligent field devices; and wherein the processor is automatically executes an operation, on each of the plurality of intelligent field devices defined in the map, based on the defined user configuration template, in response to a received request, from the user through the user interface component, to automatically execute the operation for the plurality of intelligent field devices.

15. The system of claim 14, wherein the operation is a field device commissioning operation.

16. The system of claim 14, wherein the operation is a field device verification operation.

* * * * *